US011887544B2

(12) United States Patent
Nam et al.

(10) Patent No.: US 11,887,544 B2
(45) Date of Patent: Jan. 30, 2024

(54) DISPLAY DEVICE AND ELECTRONIC DEVICE HAVING THE SAME

(71) Applicant: Samsung Display Co., Ltd., Yongin-si (KR)

(72) Inventors: Yanguk Nam, Hwaseong-si (KR); Dae-Sik Lee, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/404,518

(22) Filed: May 6, 2019

(65) Prior Publication Data

US 2019/0355307 A1 Nov. 21, 2019

(30) Foreign Application Priority Data

May 21, 2018 (KR) ........................ 10-2018-0057810

(51) Int. Cl.

*G09G 3/3258* (2016.01)
*G09G 3/3266* (2016.01)
(Continued)

(52) U.S. Cl.

CPC ......... *G09G 3/3258* (2013.01); *G09G 3/3266* (2013.01); *G09G 3/3291* (2013.01); *G09G 3/3696* (2013.01); *G09G 2310/08* (2013.01); *G09G 2320/0233* (2013.01); *G09G 2320/0247* (2013.01); *G09G 2320/041* (2013.01);
(Continued)

(58) Field of Classification Search

None
See application file for complete search history.

(56) References Cited

U.S. PATENT DOCUMENTS 10,197,838 B2 2/2019 Nam et al.
2004/0008197 A1* 1/2004 Miyazaki ............ G09G 3/3696 345/212
(Continued)

FOREIGN PATENT DOCUMENTS

KR 10-2011-0123983 A 11/2011
KR 10-2017-0060662 A 6/2017
(Continued)

OTHER PUBLICATIONS

Korean Office Action dated Apr. 11, 2022 regarding Korean Patent Application No. 10- 2018-0057810 corresponding to U.S. Appl. No. 16/404,518 (7 pages).

*Primary Examiner* — Benjamin X Casarez

(74) *Attorney, Agent, or Firm* — Lewis Roca Rothgerber Christie LLP

(57) ABSTRACT

A display device includes a display panel including a plurality of pixels, a data driver configured to provide a data signal to the pixels, a scan driver configured to provide a scan signal to the pixels, a power controller configured to provide a driving voltage to the data driver and the scan driver, and a timing controller configured to generate a data control signal that controls the data driver, a scan control signal that controls the scan driver, and a power control signal that controls the power controller based on an image data and a control signal. The power controller determines a transient time that changes the driving voltage from a first voltage level to a second voltage level based on the power control signal.

19 Claims, 9 Drawing Sheets

(51) Int. Cl.
*G09G 3/3291* (2016.01)
*G09G 3/36* (2006.01)

(52) U.S. Cl.
CPC . *G09G 2330/021* (2013.01); *G09G 2330/028* (2013.01); *G09G 2340/0435* (2013.01)

(56) References Cited

U.S. PATENT DOCUMENTS

2007/0229447 A1* 10/2007 Takahara ............. G09G 3/3406 345/102
2011/0050676 A1* 3/2011 Lee ...................... G09G 3/3233 345/212
2011/0175895 A1* 7/2011 Hayakawa ........... G09G 3/3655 345/212
2011/0273109 A1* 11/2011 Park ..................... G09G 3/3225 315/291
2012/0069059 A1* 3/2012 Lee ...................... G09G 3/3225 345/690
2013/0082910 A1* 4/2013 Lee ...................... G09G 3/3208 345/76
2015/0009198 A1* 1/2015 Park ..................... G09G 3/3233 345/212
2015/0255042 A1* 9/2015 Oh ........................... G09G 5/18 345/212
2017/0098410 A1* 4/2017 Lee ...................... G09G 3/2096
2017/0148390 A1* 5/2017 Park ...................... G06F 1/3265
2017/0213517 A1* 7/2017 Lee ...................... G09G 3/3696
2018/0061294 A1* 3/2018 Kim ....................... G09G 3/006
2018/0061322 A1* 3/2018 Yim ..................... G09G 3/3233
2018/0158397 A1 6/2018 Nam et al.

FOREIGN PATENT DOCUMENTS

KR 10-2017-0084752 A 7/2017
KR 10-2018-0025436 A 3/2018
KR 10-2018-0065063 A 6/2018

* cited by examiner

FIG. 3

| | Block | Option |
|---|---|---|
| 00 | AVDD | 0:1ST DRIVING MODE,<br>1:2ND DRIVING MODE |
| 01 | VGM | 0:1ST DRIVING MODE,<br>1:2ND DRIVING MODE |
| 10 | VCOM | 0:1ST DRIVING MODE,<br>1:2ND DRIVING MODE |
| ⋮ | ⋮ | ⋮ |

FIG. 4

| | 000 | 001 | 010 | 011 | 100 | 101 | 110 | 111 |
|---|---|---|---|---|---|---|---|---|
| VC | 1LSB/1us | 1LSB/2us | 1LSB/5us | 1LSB/10us | 1LSB/20us | 1LSB/40us | 1LSB/70us | 1LSB/100us |

DISPLAY DEVICE AND ELECTRONIC DEVICE HAVING THE SAME

CROSS-REFERENCE TO RELATED APPLICATION

This application claims priority to and the benefit of Korean Patent Application No. 10-2018-0057810, filed on May 21, 2018 in the Korean Intellectual Property Office (KIPO), the entire content of which is incorporated herein in its entirety by reference.

BACKGROUND

1. Field

Example embodiments relate generally to a display device and an electronic device having the same.

2. Description of the Related Art

Flat panel display (FPD) devices are widely used as display devices for electronic devices because FPD devices are relatively lightweight and thin compared to cathode-ray tube (CRT) display devices. Examples of FPD devices are liquid crystal display (LCD) devices, field emission display (FED) devices, plasma display panel (PDP) devices, and organic light emitting display (OLED) devices. The OLED devices have been spotlighted as next-generation display devices because the OLED devices have various advantages such as a wide viewing angle, a rapid response speed, a thin (slim) thickness, low power consumption, etc.

The display device may include a plurality of pixels and a driver that generates driving signals to the plurality of pixels. Recently, a method that changes a voltage level of a driving voltage of the display device is used for changing a driving frequency or decreasing power consumption.

The above information disclosed in this Background section is only for enhancement of understanding of the background of the invention and therefore it may contain information that does not constitute prior art.

SUMMARY

This summary is provided to introduce a selection of features and concepts of embodiments of the present disclosure that are further described below in the detailed description. This summary is not intended to identify key or essential features of the claimed subject matter, nor is it intended to be used in limiting the scope of the claimed subject matter. One or more of the described features may be combined with one or more other described features to provide a workable device.

Some example embodiments provide a display device capable of improving display quality when a driving voltage is changed.

Some example embodiments provide an electronic device capable of improving display quality when a driving voltage is changed.

According to an aspect of example embodiments, a display device may include a display panel including a plurality of pixels, a data driver configured to provide a data signal to the pixels, a scan driver configured to provide a scan signal to the pixels, a power controller configured to provide a driving voltage to the data driver and the scan driver, and a timing controller configured to generate a data control signal that controls the data driver, a scan control signal that controls the scan driver, and a power control signal that controls the power controller based on an image data and a control signal. The power controller may determine a transient time that changes the driving voltage from a first voltage level to a second voltage level based on the power control signal.

In some example embodiments, the power controller may store a plurality of transient speeds of the driving voltage corresponding to a bit and select one of the transient speeds based on the power control signal.

In some example embodiments, the power controller may change the driving voltage from the first voltage level to the second voltage level at the selected transient speed.

In some example embodiments, the power controller may be driven in a first driving mode during which the transient time of the driving voltage is uniformly maintained or a second driving mode during which the transient time of the driving voltage is changed based on the power control signal.

In some example embodiments, the power controller may be driven in the first driving mode based on the power control signal from the timing controller, and the power controller may change the voltage level of the driving voltage at a first transient speed in the first driving mode.

In some example embodiments, the power controller may be driven in the second driving mode based on the power control signal from the timing controller when a driving frequency of the display device is changed, and the power controller may change the voltage level of the driving voltage from the first voltage level to the second voltage level at a second transient speed faster than the first transient speed in the second driving mode.

In some example embodiments, the power controller may be driven in the second driving mode based on the power control signal from the timing controller when the display device turns on, and the power controller may change the voltage level of the driving voltage from the first voltage level to the second voltage level at a third transient speed slower than the first transient speed in the second driving mode.

In some example embodiments, the power controller may be driven in the second driving mode based on the power control signal from the timing controller when gamma voltages of the display device are changed, and the power controller may change the voltage level of the driving voltage from the first voltage level to the second voltage level at a third transient speed slower than the first transient speed in the second driving mode.

In some example embodiments, the power controller may be driven in the second driving mode based on the power control signal from the timing controller when the image data having a set or predetermined pattern is provided, and the power controller may change the voltage level of the driving voltage from the first voltage level to the second voltage level at a third transient speed slower than the first transient speed in the second driving mode.

In some example embodiments, the timing controller may provide the power control signal to the power controller based on a peripheral temperature of the display device, the power controller may be driven in the second driving mode based on the power control signal from the timing controller, and the power controller may change the voltage level of the driving voltage from the first voltage level to the second voltage level at a third transient speed slower than the first transient speed in the second driving mode.

In some example embodiments, the driving voltage may be an analog driving voltage (AVDD) to the data driver.

In some example embodiments, the driving voltage may be a common voltage (VCOM) to the data driver.

According to an aspect of example embodiments, an electronic device may include a display device and a processor that controls the display device. The display device may include a display panel including a plurality of pixels, a data driver configured to provide the data signal to the pixels, a scan driver configured to provide the scan signal to the pixels, a power controller configured to provide a driving voltage to the data driver and the scan driver and a timing controller configured to generate a data control signal that controls the data driver, a scan control signal that controls the scan driver, and a power control signal that controls the power controller based on an image data and a control signal. The power controller determines a transient time that changes the driving voltage from a first voltage level to a second voltage level based on the power control signal.

In some example embodiments, the power controller may store a plurality of transient speeds of the driving voltage corresponding to a bit and selects one of the transient speeds based on the power control signal.

In some example embodiments, the power controller may change the driving voltage from the first level to the second level at the selected transient speed.

In some example embodiments, the power controller may store a first transient speed of the driving voltage corresponding to a bit, a second transient speed faster than the first transient speed, and a third transient speed slower than the first transient speed. The power controller may select one of the first transient speed, the second transient speed, and the third transient speed based on the power control signal.

In some example embodiments, the power controller may change the voltage level of the driving voltage at the first transient speed in a first driving mode during which the transient speed of the driving speed is uniformly maintained.

In some example embodiments, the power controller may be driven in a second driving mode during which the transient time of the driving voltage is changed based on the power control signal from the timing controller when a driving frequency of the display device is changed. The power controller may change the voltage level of the driving voltage from the first voltage level and the second voltage level at the second transient speed in the second driving mode.

In some example embodiments, the power controller may be driven in a second driving mode during which the transient time of the driving voltage is changed based on the power control signal from the timing controller when the display device turns on. The power controller may change the voltage level of the driving voltage from the first voltage level to the second voltage level at the third transient speed in the second driving mode.

In some example embodiments, the power controller may be driven in a second driving mode during which the transient time of the driving voltage is changed based on the power control signal from the timing controller when gamma voltages of the display device is changed. The power controller may change the voltage level of the driving voltage from the first voltage level to the second voltage level at the third transient speed in the second driving mode.

Therefore, the display device and the electronic device having the same may prevent or protect from defects such as a luminance difference and a flicker when the driving voltage is changed by the power controller that determines the transient time of the driving voltage to the data driver based on the power control signal from the timing controller. Thus, display quality may improve.

BRIEF DESCRIPTION OF THE DRAWINGS

Illustrative, non-limiting example embodiments will be more clearly understood from the following detailed description taken in conjunction with the accompanying drawings.

FIGS. 3 and 4 are diagrams illustrating a power controller included in the display device of FIG. 1, according to some example embodiments.

DETAILED DESCRIPTION

The detailed description set forth below in connection with the appended drawings is intended as a description of some example embodiments of a display device and an electronic device having the same provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the scope of the invention. As denoted elsewhere herein, like element numbers are intended to indicate like elements or features. Hereinafter, the present inventive concept will be explained in detail with reference to the accompanying drawings.

Figure 1:
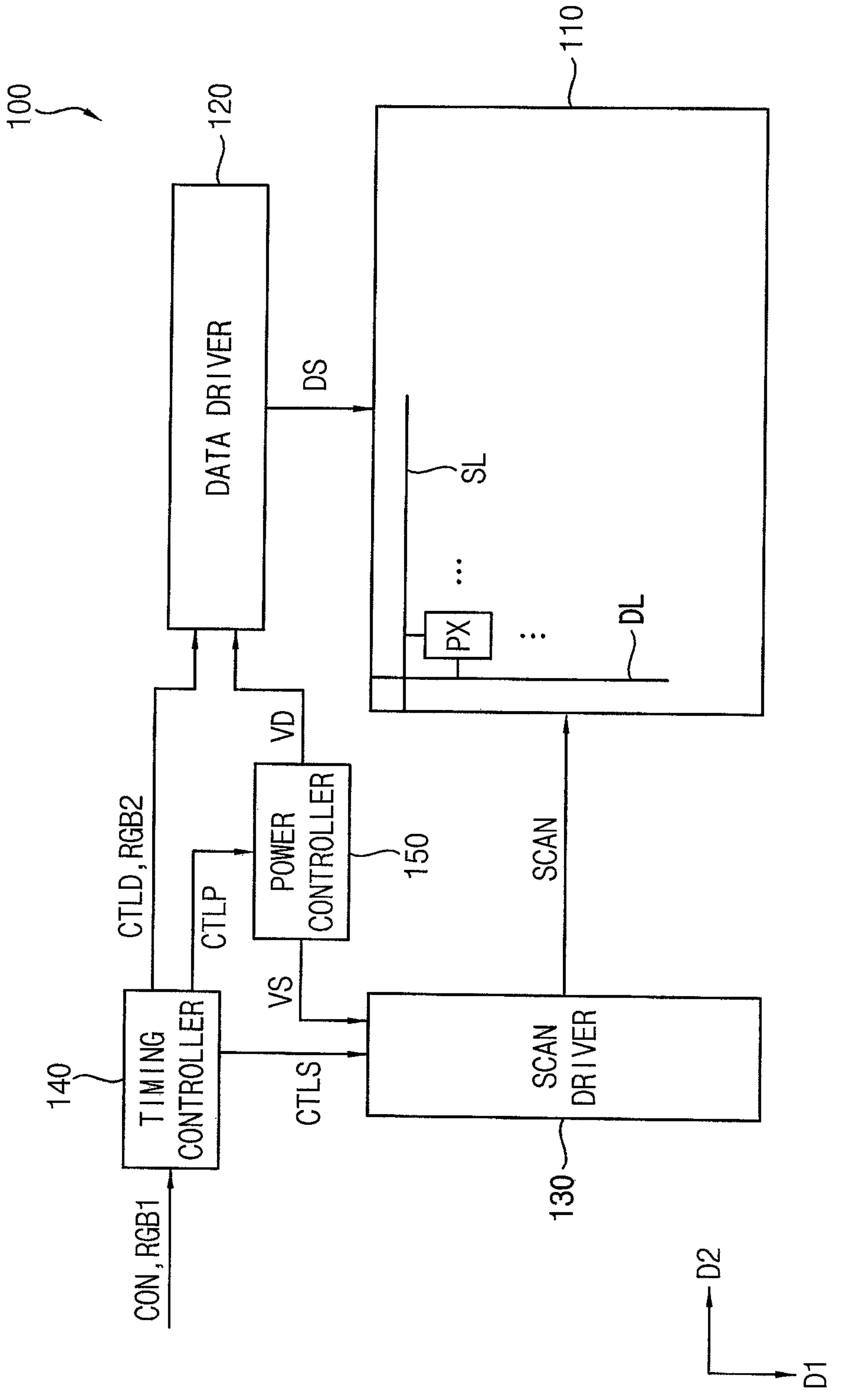
FIG. 1 is a block diagram illustrating a display device, according to some example embodiments.
Figure 2:
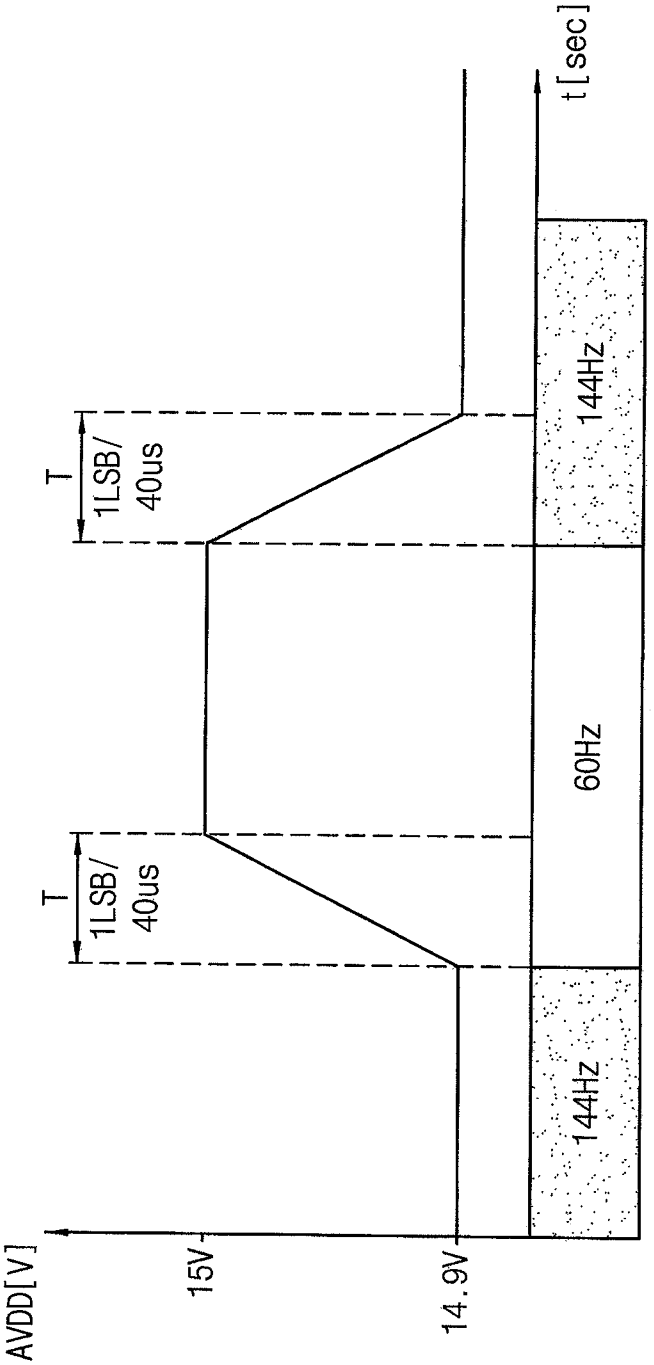
FIG. 2 is a diagram illustrating a related art.

FIG. 1 is a block diagram illustrating a display device according to example embodiments. FIG. 2 is a diagram illustrating a related art. FIGS. 3 and 4 are diagrams illustrating a power controller included in the display device of FIG. 1.

Referring to FIG. 1, a display device 100 may include a display panel 110, a data driver 120, a scan driver 130, a power controller 150, and a timing controller 140.

The display panel 110 may include a plurality of pixels PX. A plurality of data lines DL and a plurality of scan lines SL may be formed in the display panel 110. The data lines DL may extend in a first direction D1 and may be arranged with each other in a second direction D2 perpendicular to or crossing the first direction D1. The scan lines SL may extend in the second direction D2 and may be arranged with each other in the first direction D1. The first direction D1 may be parallel with a long side of the display panel 110, and the second direction D2 may be parallel with the short side of the display panel 110. Each of the pixels PX may be formed in an intersection or crossing region of the data line DL and the scan line SL. In some example embodiments, each of the pixels PX may include a thin film transistor electrically coupled to the data line DL and the scan line SL, a liquid crystal capacitor, and a storage capacitor coupled to the thin film transistor. Here, the display panel 110 may be a liquid crystal display panel, and the display device 100 may be a liquid crystal display device.

The data driver 120 may provide a data signal DS to the pixels PX. The data driver 120 may be composed by a plurality of data driving integrated circuits. The data driver 120 may receive a second image data RGB2 and a data control signal CTLD from the timing controller 140. The data driver 120 may receive a data driving voltage VD from the power controller 150. For example, the data control signal CTLD may include a horizontal start signal and a first clock signal. The data driving voltage VD may include an analog driving voltage AVDD and a gamma voltage VGM. The data driver 120 may convert the second image data RGB2 to an analog image data signal and provide the analog image data signal to the data lines DL as the data signal DS according to the data control signal CTLD.

The scan driver 130 may provide the scan signal SCAN to the pixels PX. The scan driver 130 may receive the scan control signal CTLS from the timing controller 140 and the scan voltage VS from the power controller 150. For example, the scan control signal CTLS may include a vertical start signal and a second clock signal. The scan voltage VS may include a gate on voltage, a gate off voltage, and a gate driving voltage. The scan driver 130 may generate the scan signal SCAN based on the scan control signal CTLS and the scan voltage VS, and provide the scan signal SCAN to the scan lines SL.

The timing controller 140 may generate a data control signal CTLD that controls the data driver 120, a scan control signal CTLS that controls the scan driver 130, and a power control signal CTLP that controls the power controller 150 based on a first image data RGB1 and an input control signal CON from an external device. The timing controller 140 may receive the first image data RGB1 and the input control signal CON from the external device. The first image data RGB1 may include a red image data, a green image data, and a blue image data. The timing controller 140 may provide the second image data RGB2 to the data driver 120. Here, the second image data RGB2 may be substantially the same as the first image data RGB1 or may be an image data to which the first image data RGB1 is compensated. For example, the timing controller 140 may generate the second image data RGB2 by selectively performing an image enhancement, an adaptive color correction (ACC), dynamic capacitance compensation (DCC), etc. The input control signal CON may include a horizontal synchronization signal, a vertical synchronization signal, a clock signal, etc. The timing controller 140 may generate a horizontal start signal using the horizontal synchronization signal and generate a first clock signal using the clock signal. The timing controller 140 may output the horizontal start signal, the first clock signal, and the like, to the data driver 120 as the data control signal CTLD. Further, the timing controller 140 may generate the vertical start signal using the vertical synchronization signal and generate a second clock signal using the clock signal. The timing controller 140 may output the vertical start signal, the second clock signal, etc. to the scan driver 130 as the scan control signal CTLS.

The power controller 150 may provide the driving voltage to each of the data driver 120 and the scan driver 130. The power controller 150 may provide an analog driving voltage AVDD, a gamma voltage VGM, a common voltage VCOM, and the like, that are reference voltages for converting the second image data RGB2 to the data driver 120. The data driver 120 may receive the analog driving voltage AVDD and the gamma voltage VGM from the power controller 150 and the second image data RGB2 from the timing controller 140. The data driver 120 may convert the second image data RGB2 to the data signal DS based on the analog driving voltage AVDD and the gamma voltage VGM. The power controller 150 may provide the gate on voltage, the gate off voltage, the gate driving voltage, etc. for generating the scan signal SCAN to the scan driver 130.

Referring to FIG. 2, the power controller of the related art may maintain an optimized luminance by changing a voltage level of the analog driving voltage AVDD when a driving frequency of the display device 100 is changed. The power controller may change the voltage level of the analog driving voltage AVDD during a set or predetermined time. For example, the power controller may change the voltage level of the analog driving voltage AVDD at 1 LSB/40 us speed. Here, the 1 LSB is a voltage level corresponding to 1 bit. When the 1 LSB corresponds to 0.1V and a transient speed of the analog driving voltage AVDD is 1 LSB, 0.1V of the analog driving voltage AVDD may be changed during 40 us. That is, a transient time T of the analog driving voltage AVDD of FIG. 2 is 40 us. Defects such as a luminance difference, a flicker, etc. may occur while the voltage level of the analog driving voltage AVDD is changed. The display device 100 according to example embodiments may improve the defects such as the luminance difference and a flicker by including the power controller 150 that determines the transient time during which the voltage level of the driving voltage is changed based on a power control signal CTLP from the timing controller 140.

The timing controller 140 may generate the power control signal CTLP that controls the power controller 150 based on the first image data RGB1 and the input control signal CON. The timing controller 140 may generate the power control signal CTLP that determines the driving voltage, a driving mode of the display device 100, and a transient speed of the driving voltage when the timing controller 140 detects a change in the voltage level of the driving voltage (e.g., the analog driving voltage, the gamma voltage, the common voltage, or the like). In some example embodiments, the timing controller 140 may output the power control signal CTLP when the driving frequency of the display device 100 is changed. In some other example embodiments, the timing controller 140 may output the power control signal CTLP when the power of the display device 100 is turned on. In some other example embodiments, the timing controller 140 may output the power control signal CTLP when the gamma voltage VGM is changed. In some other example embodiments, the timing controller 140 may output the power control signal CTLP when the first image data RGB1 that includes a set or predetermined pattern is provided. In some other example embodiments, the timing controller 140 may output the power control signal CTLP based on a peripheral temperature of the display device 100. The power control signal CTLP may include information for selecting the driving voltage, the driving mode of the display device 100, and the transient speed of the driving voltage. For example, when the power control signal CTLP is a 6 bit signal, 2 bit of the 6 bit signal may represent the driving voltage, 1 bit of the 6 bit signal may represent the driving mode, and 3 bit of the 6 bit may represent the transient speed of the driving voltage. The driving voltage, the driving mode, and the transient speed may be set or predetermined and then stored in the display device in a manufacturing process. The transient speed of the voltage level of the driving voltage may be determined by an experiment considering the display quality.

In some example embodiments, the power controller 150 determines the transient time during which the voltage level of the driving voltage is changed from the first voltage level to the second voltage level based on the power control signal CTLP. Here, the driving voltage may be one of the analog driving voltage AVDD, the gamma voltage VGM, and the common voltage VCOM.

Referring to FIG. 3, the power controller 150 may select one of the analog driving voltage AVDD, the gamma voltage VGM, and the common voltage VCOM based on the power control signal CTLP. For example, the power controller 150 may select one of the analog driving voltage AVDD, the gamma voltage VGM, and the common voltage VCOM based on the 2 bit of the power control signal CTLP. Referring to FIG. 3, the power controller 150 may select the analog driving voltage AVDD when the 2 bit of the power control signal CTLP is 00, select the gamma voltage VGM when the 2 bit of the power control signal CTLP is 01, and select the common voltage VOM when the 2 bit of the power control signal CTLP is 10. Further, the power controller 150 may select one of the first driving mode during which the transient time of the driving voltage is uniformly maintained and the second driving mode during which the transient time of the driving voltage is changed based on the power control signal CTLP. Referring to FIG. 3, the power controller 150 may be driven in the first driving mode when the 1 bit of the power control signal CTLP is 0 and be driven in the second driving mode when the 1 bit of the power control signal CTLP is 1. Referring to FIG. 3, the power controller 150 may output the analog driving voltage AVDD in the first driving mode when the 3 bit of the power control signal CTLP is 000. The power controller 150 may output the analog driving voltage AVDD in the second driving mode when the 3 bit of the power control signal CTLP is 001. Further, the power controller 150 may output the gamma voltage VGM in the first driving mode when the 3 bit of the power control signal CTLP is 010. The power controller 150 may output the gamma voltage VGM in the second driving mode when the 3 bit of the power control signal CTLP is 011. Further, the power controller 150 may output the common voltage VCOM in the first driving mode when the 3 bit of the power control signal CTLP is 100. The power controller 150 may output the common voltage VCOM in the second driving mode when the 3 bit of the power control signal CTLP is 101. Although, the power controller 150 (that outputs the analog driving voltage AVDD, the gamma voltage VGM, and the common voltage VCOM) is described, the driving voltage output from the power controller 150 is not limited thereto.

Referring to FIG. 4, the power controller 150 may select the transient speed of the driving voltage in the second driving mode based on the power control signal CTLP. The power controller 150 may store the plurality of transient speeds VC of the voltage level of the driving voltage corresponding to 1 bit. For example, the power controller 150 may store the transient speeds VC in the lookup table (LUT). Although, 8 transient speeds VC corresponding to 3 bit of the power control signal CTLP are described in FIG. 4, the transient speeds VC are not limited thereto. For example, the power controller 150 may store 4 transient speeds VC corresponding to 2 bit of the power control signal CTLP or store 16 transient speeds VC corresponding to 4 bit of the power control signal CTLP. Further, the power controller 150 may change the transient speed VC stored in the lookup table by changing the voltage level of the driving voltage corresponding to the 1 bit. For example, the power controller 150 may select the transient speed VC based on the 3 bit of the power control signal CTLP. Referring to FIG. 4, the power controller 150 may change the voltage level of the driving voltage at 1 LSB/1 us when the 3 bit of the power control signal CTLP is 000. The power controller 150 may change the voltage level of the driving voltage at 1 LSB/2 us when the 3 bit of the power control signal CTLP is 001. The power controller 150 may change the voltage level of the driving voltage at 1 LSB/5 us when the 3 bit of the power control signal is 010. The transient speed VC of the voltage level of the driving voltage is determined by an experiment considering the display quality of the display device 100.

In some example embodiments, the power controller 150 may be driven in the second driving mode and may select a second transient speed (e.g., 1 LSB/5 us) faster than a first transient speed (e.g., 1 LSB/40 us) based on the power control signal CTLP, when the driving frequency of the display device 100 is changed. In such a case, the power controller 150 may change the driving voltage from the first voltage level to the second voltage level at the second transient speed. For example, the first transient speed (e.g., 1 LSB/40 us) is a default value. In other example embodiments, the power controller 150 may be driven in the second driving mode and may select a third transient speed (e.g., 1 LSB/100 us) slower than the first transient speed (e.g., 1 LSB/40 us) based on the power control signal CTLP when the power of the display device 100 turns on. In such a case, the power controller 150 may change the driving voltage from the first voltage level to the second voltage level at the third transient speed. In some other example embodiments, the power controller 150 may be driven in the second driving mode and may select the third transient speed (e.g., 1 LSB/100 us) slower than the first transient speed (e.g., 1 LSB/40 us) based on the power control signal CTLP when the gamma voltage VGM of the display device 100 is changed (i.e., when a dynamic analog driving voltage (Dynamic AVDD) is adjusted to the display device 100). In such a case, the power controller 150 may change the driving voltage from the first voltage level to the second voltage level at the third transient speed. In some other example embodiments, the power controller 150 may be driven in the second driving mode and may select the third transient speed (e.g., 1 LSB/100 us) slower than the first transient speed (e.g., 1 LSB/40 us) based on the power control signal CTLP, when the first image data RGB1 having the set or predetermined pattern is provided to the display device 100. In such a case, the power controller 150 may change the driving voltage from the first voltage level to the second voltage level at the third transient speed. For example, the set or predetermined pattern is the pattern that spends more set or predetermined power consumption. In some other example embodiments, the timing controller 140 may provide the power control signal CTLP to the power controller 150 based on the peripheral temperature of the display device 100. The power controller 150 may be driven in the second driving mode and may select the third transient speed (e.g., 1 LSB/100 us) slower than the first transient speed (e.g., 1 LSB/40 us) based on the power control signal CTLP. In such a case, the power controller 150 may change the driving voltage from the first voltage level to the second voltage level at the third transient speed.

As described above, the display device 100 according to some example embodiments may counter or prevent the defects such as the luminance difference, the flicker, or the like, by including the power controller 150 that determines the transient time during which the voltage level of the driving voltage is changed from the first voltage level to the second voltage level provided to the data driver 120 based on the power control signal CTLP.

Figure 5:
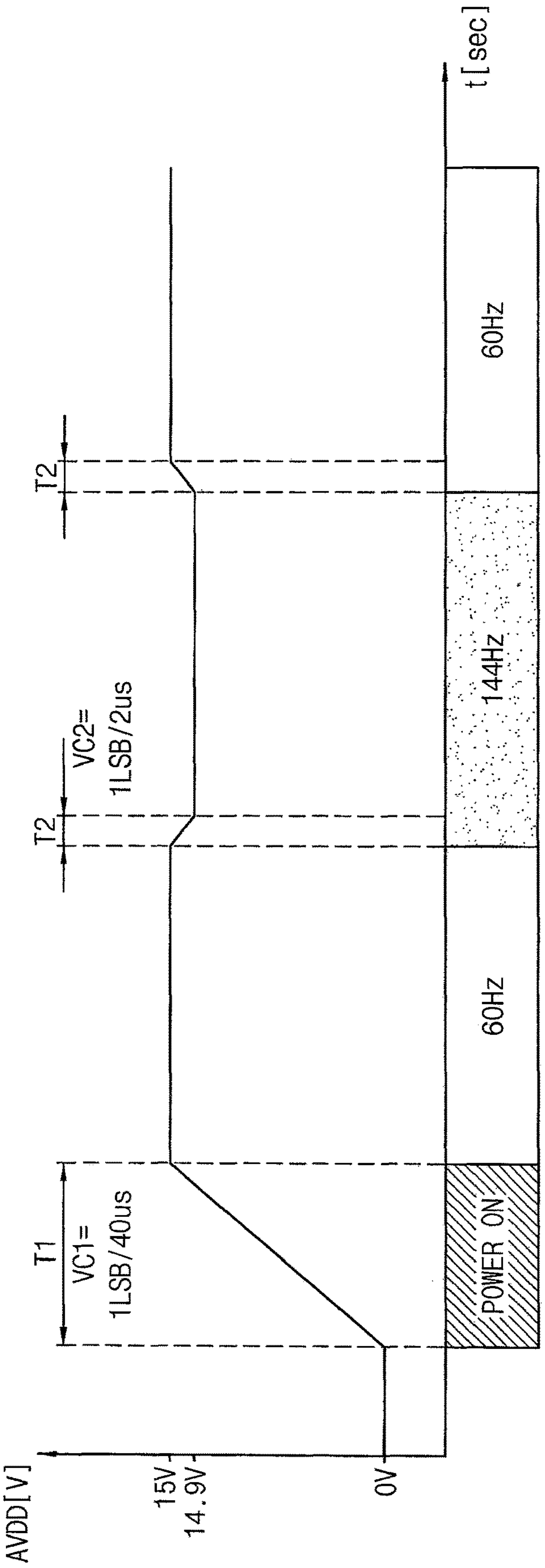
FIG. 5 is a diagram illustrating an example operation of a power controller included in the display device of FIG. 1.

FIG. 5 is a diagram illustrating an example operation of a power controller (e.g., 150) included in the display device 100 of FIG. 1.

Referring to FIG. 5, the power controller 150 may change the transient time that changes the voltage level of the analog driving voltage AVDD. The timing controller 140 may provide the power control signal CTLP that drives the power controller 150 in the second driving mode that changes the transient time of the analog driving voltage AVDD and selects one of the transient times stored in the power controller 150 to the timing controller 140 when the display device 100 turns on. The power controller 150 may change the voltage level of the analog driving voltage AVDD based on the power control signal CTLP from the timing controller 140. When the display device 100 turns on, the voltage level of the analog driving voltage AVDD may rapidly increase so that an over current protector (OCP) in the power controller 150 may be operated by inrush current, or elements in the display device 100 may be damage by the inrush current. Thus, the transient time of the analog driving voltage AVDD may be determined considering the inrush current. For example, the power controller may determine the transient speed of the analog driving voltage AVDD as 1 LSB/40 us when the display device turns on. The power controller may change the voltage level of the analog driving voltage AVDD at the transient time 1 LSB/40 us during a first time T1.

The power controller 150 may change the voltage level of the analog driving voltage AVDD based on the power control signal CTLP from the timing controller 140 when the driving frequency of the display device 100 is changed. The timing controller 140 may provide the power control signal CTLP that drives the power controller 150 in the second driving mode that changes the transient time of the analog driving voltage AVDD and selects one of the transient times stored in the power controller 150 when the driving frequency of the display device 100 is changed. The power controller 150 may change the voltage level of the analog driving voltage AVDD based on the power control signal CTLP from the timing controller 140. When the driving frequency of the display device 100 is changed, the luminance difference and the flicker may occur during the transient time of the analog driving voltage AVDD. Thus, the power controller 150 may counter or prevent the luminance difference and the flicker by decreasing the transient time of the analog driving voltage AVDD. However, the over current protector (OCP) in the power controller 150 is operated by inrush current, or the elements in the display device 100 are damage by the inrush current when the analog driving voltage AVDD is rapidly changed. Thus, the transient time of the analog driving voltage AVDD may be determined considering the inrush current and defects, such as, the luminance difference and the flicker when the driving frequency of the display device 100 is changed. For example, referring to FIG. 5, the power controller 150 may determine the transient speed of the analog driving voltage AVDD as the 1 LSB/2 us. The power controller may change the voltage level of the analog driving voltage AVDD at the transient speed of 1 LSB/2 us during a second time T2.

As described above, the power controller 150 may prevent or reduce the display device 100 damage, the luminance difference, and the flicker by changing the transient speed of the analog driving voltage AVDD.

Figure 6:
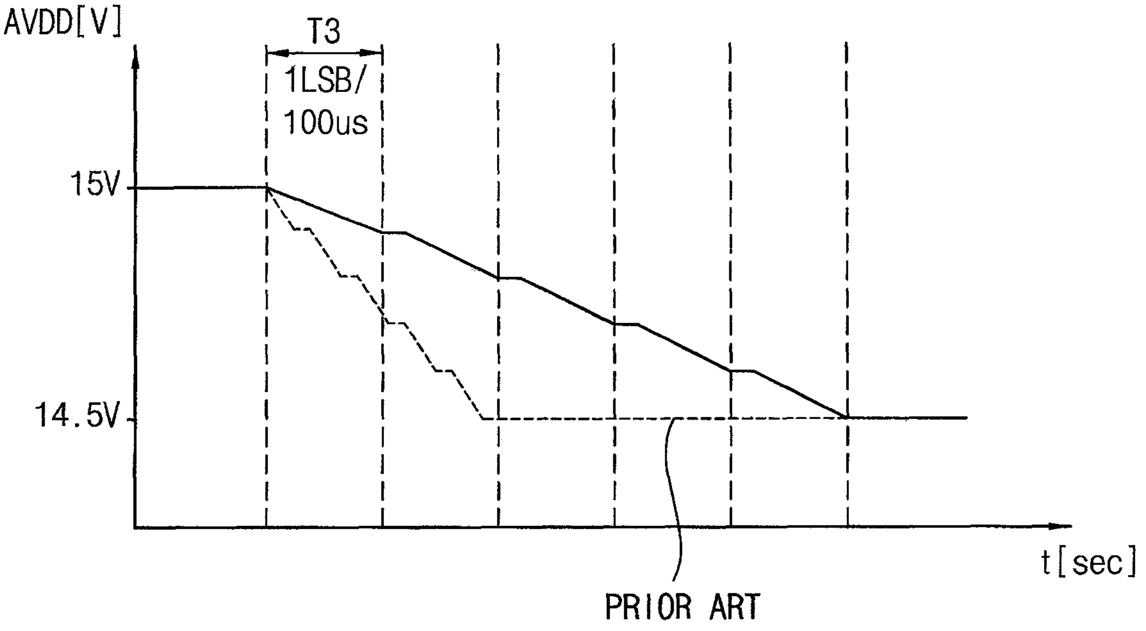
FIG. 6 is a diagram illustrating another example operation of a power controller included in the display device of FIG. 1.

FIG. 6 is a diagram illustrating another example of an operation of a power controller (e.g., 150) included in the display device 100 of FIG. 1.

Referring to FIG. 6, the power controller 150 may change the transient time of the analog driving voltage AVDD. The timing controller 140 may provide the power control signal CTLP that drives the power controller 150 in the second driving mode that changes the transient time of the analog driving voltage AVDD and selects one of the transient times stored in the power controller 150 when the gamma voltage of the display device 100 is changed. The power controller 150 may change the voltage level of the analog driving voltage AVDD based on the power control signal CTLP from the timing controller 140. A method that changes the gamma voltages to improve the display quality or power consumption may be used. The voltage level of the analog driving voltage AVDD may determine the voltage levels of the gamma voltages. Thus, the analog driving voltage AVDD may be changed to change the gamma voltages. User may recognize the luminance change of an image displayed on the display panel 110 when the analog driving voltage AVDD is rapidly changed to change the gamma voltage. Thus, the transient time of the analog driving voltage AVDD may be determined considering the user's recognition. The power controller 150 may increase the transient time of the analog driving voltage AVDD. Thus, the user may naturally recognize the luminance change. For example, referring to FIG. 6, the power controller may determine the transient speed of the analog driving voltage AVDD as 1 LSB/100 us when the gamma voltage is changed. The power controller 150 may change the voltage level of the analog driving voltage AVDD at the transient time 1 LSB/100 us during a third time T3.

Figure 7:
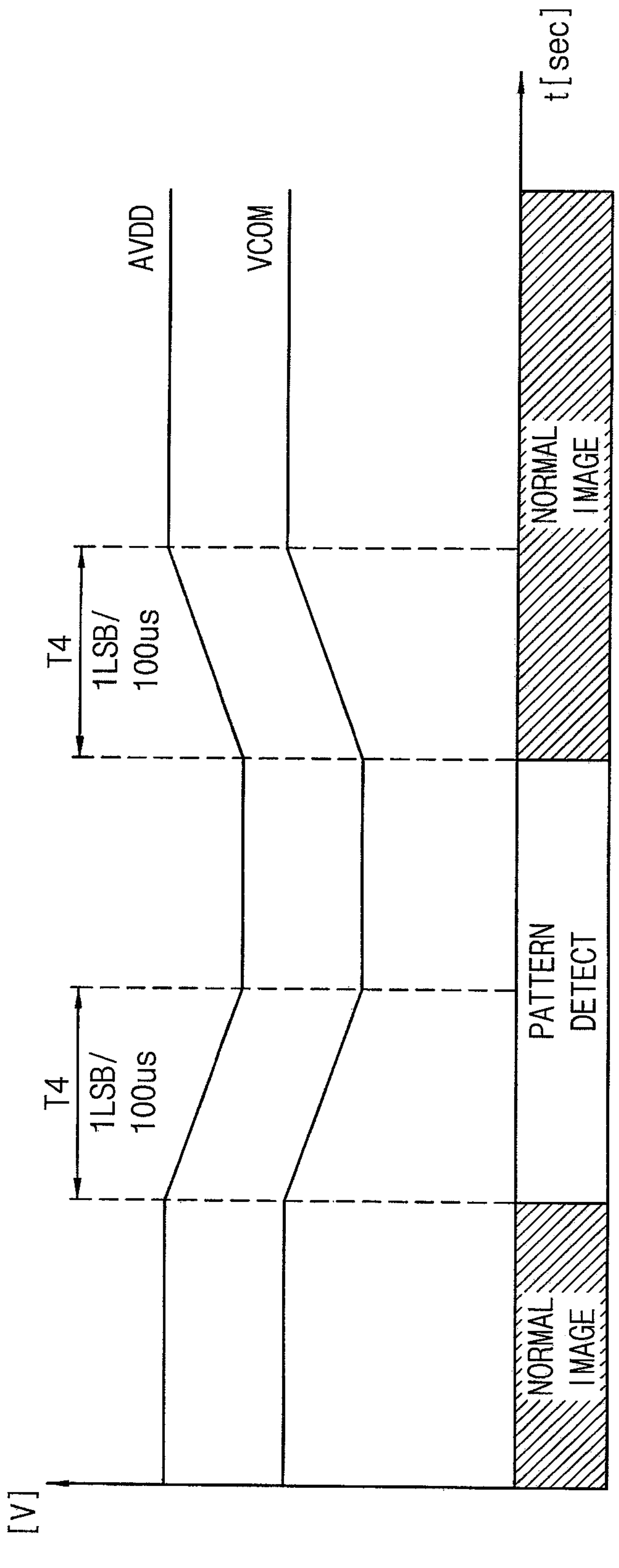
FIG. 7 is a diagram illustrating yet another example operation of a power controller included in the display device of FIG. 1.

FIG. 7 is a diagram illustrating yet another example of an operation of a power controller (e.g., 150) included in the display device 100 of FIG. 1.

Referring to FIG. 7, the power controller 150 may change the transient time of the analog driving voltage AVDD and the common voltage VCOM. The timing controller 140 may analyze the first image data RGB1 from an external device (e.g., a graphic processor). The timing controller 140 may provide the power control signal CTLP that drives the power controller 150 in the second driving mode that changes the transient time of the analog driving voltage AVDD and the transient time of the common voltage VCOM and selects one of the transient times stored in the power controller 150 to the power controller 150 when the first image data RGB1 having the set or predetermined pattern is provided to the timing controller 140. For example, the set or predetermined pattern may be the pattern that spends more set or predetermined power consumption such as 2DOT pattern. In such a case, the power controller 150 may decrease the power consumption by decreasing the voltage level of the analog driving voltage AVDD and the voltage level of the common voltage VCOM. The user may recognize the luminance change of an image displayed on the display panel 110 when the analog driving voltage AVDD and the common voltage VCOM are rapidly changed. Thus, the transient time of the analog driving voltage AVDD and the transient time of the common voltage VCOM may be determined considering the user's recognition. The power controller 150 may increase the transient time of the analog driving voltage AVDD and the transient time of the common voltage VCOM. Thus, the user may naturally recognize the luminance change. For example, referring to FIG. 7, the power controller 150 may determine the transient speed of the analog driving voltage AVDD and the transient speed of the common voltage VCOM as 1 LSB/100 us, when the first image data RGB1 includes the set or predetermined pattern. The power controller 150 may change the voltage level of the analog driving voltage AVDD and the voltage level of the common voltage VCOM at the transient time 1 LSB/100 us during a fourth time T4.

Figure 8:
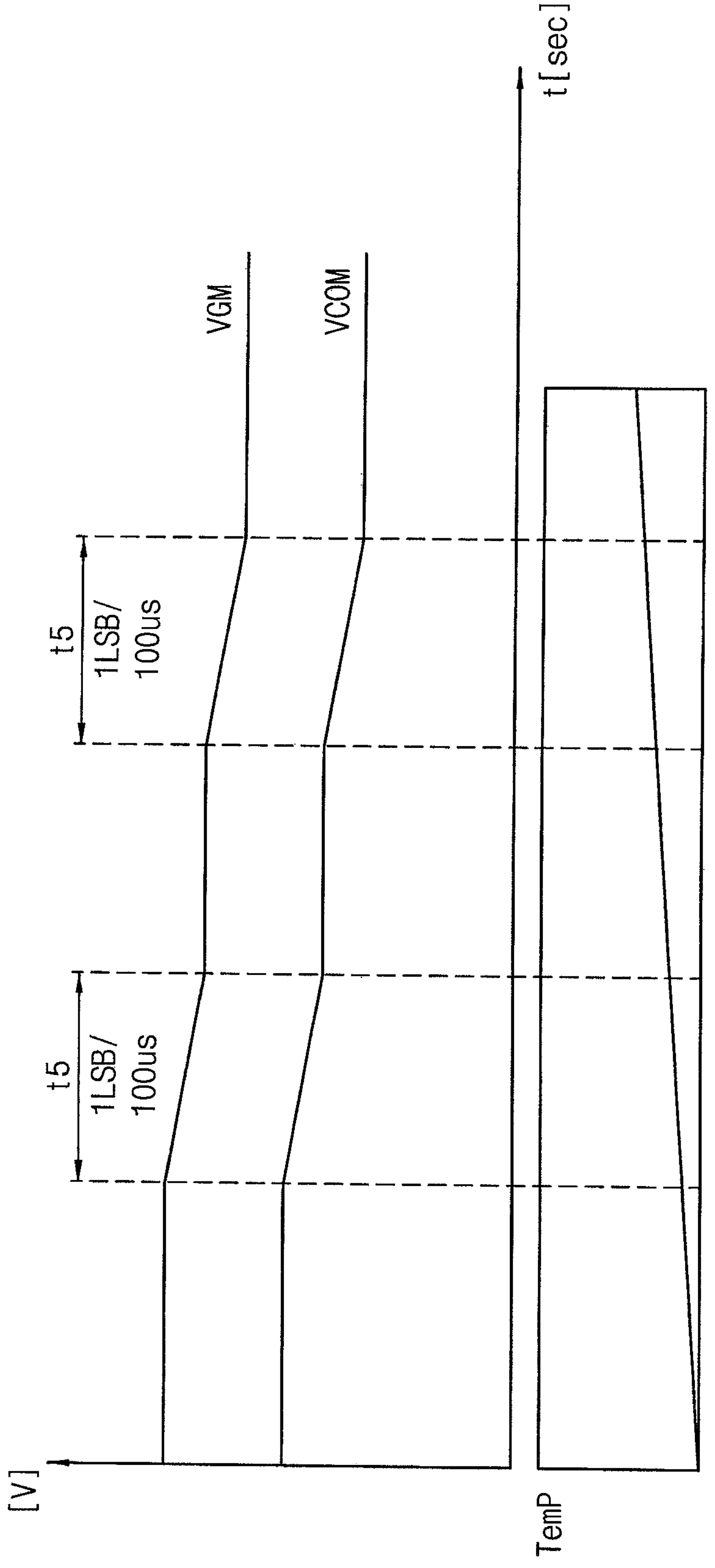
FIG. 8 is a diagram illustrating yet another example operation of a power controller included in the display device of FIG. 1.

FIG. 8 is a diagram illustrating yet another example of an operation of a power controller (e.g., 150) included in the display device 100 of FIG. 1.

Referring to FIG. 8, the power controller 150 may change the transient time of the gamma voltage VGM and the common voltage VCOM. The display device 100 may further include a temperature sensor that may measure a peripheral temperature of the display device 100. The timing controller 140 may receive a temperature data that measures the peripheral temperature of the display device 100 from the temperature sensor. The timing controller 140 may provide the power control signal CTLP and the temperature data that drives the power controller 150 in the second driving mode that changes the transient time of the gamma voltage VGM and the transient time of the common voltage VCOM and selects one of the transient times stored in the power controller 150. The power controller 150 may determine the voltage level and the transient time of the driving voltage (i.e., the analog driving voltage, the gamma voltage VGM, and the common voltage VCOM, etc.). The user may recognize the luminance change of the image displayed on the display panel 110 when the driving voltage is rapidly changed. Thus, the transient time of the driving voltage may be determined considering the user's recognition. The power controller 150 may increase the transient time of the driving voltage so that the user may naturally recognize the luminance change. Further, the power controller 150 may determine the transient time based on the temperature data. For example, referring to FIG. 8, the power controller 150 may determine the transient time of the gamma voltage VGM and the common voltage VCOM as 1 LSB/100 us when the temperature is changed. The power controller 150 may change the voltage level of the gamma voltage VGM and the common voltage VCOM at the transient speed of 1 LSB/100 us when the temperature data is the same as a set or predetermined temperature. The power controller 150 may change the voltage level of the gamma voltage VGM and the common voltage VCOM at the 1 LSB/100 us during a fifth time T5.

Figure 9:
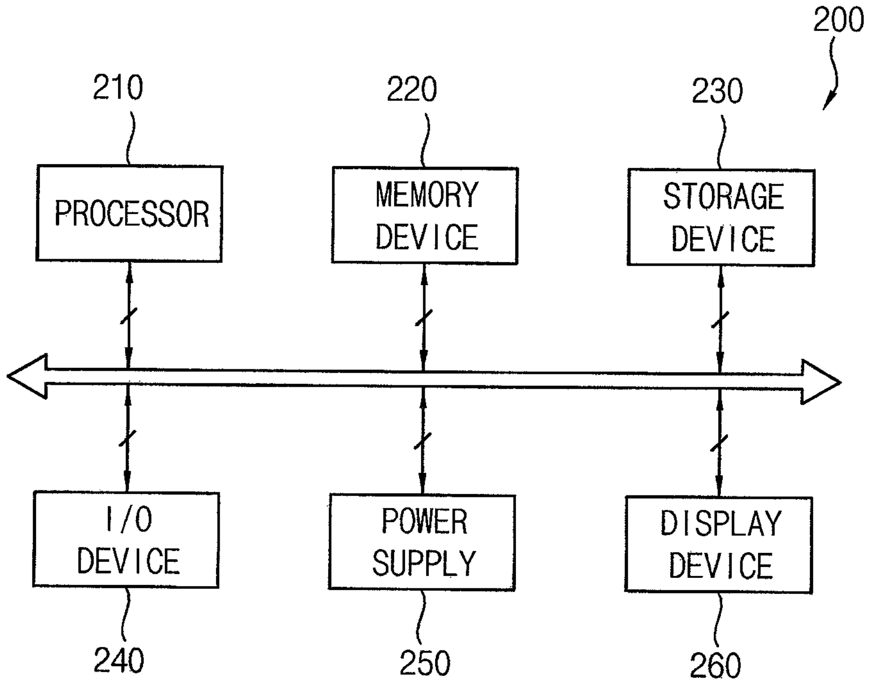
FIG. 9 is a block diagram illustrating an electronic device that includes the display device of FIG. 1, according to some example embodiments.
Figure 10:
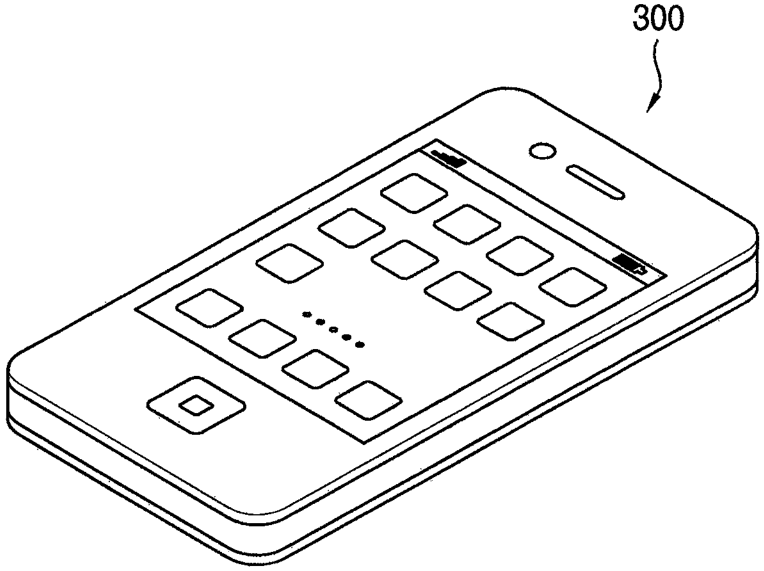
FIG. 10 is a diagram illustrating an example embodiment in which the electronic device of FIG. 9 is implemented as a smart phone.

FIG. 9 is a block diagram illustrating an electronic device that includes the display device of FIG. 1, and FIG. 10 is a diagram illustrating an example embodiment in which the electronic device of FIG. 9 is implemented as a smart phone.

Referring to FIGS. 8 and 9, an electronic device 200 may include a processor 210, a memory device 220, a storage device 230, an input/output (I/O) device 240, a power supply 250, and a display device 260. Here, the display device 260 may correspond to the liquid crystal display device 100 of FIG. 1. In addition, the electronic device 200 may further include a plurality of ports for communicating a video card, a sound card, a memory card, a universal serial bus (USB) device, other electronic device, etc. Although, it is illustrated in FIG. 9 that the electronic device 200 is implemented as a smart phone 300, the type of the electronic device 200 is not limited thereto.

The processor 210 may perform various computing functions. The processor 210 may be a microprocessor, a central processing unit (CPU), etc. The processor 210 may be coupled to other components via an address bus, a control bus, a data bus, etc. Further, the processor 210 may be coupled to an extended bus such as peripheral component interconnect (PCI) bus. The memory device 220 may store data for operations of the electronic device 200. For example, the memory device 220 may include at least one non-volatile memory device such as an erasable programmable read-only memory (EPROM) device, an electrically erasable programmable read-only memory (EEPROM) device, a flash memory device, a phase change random access memory (PRAM) device, a resistance random access memory (RRAM) device, a nano floating gate memory (NFGM) device, a polymer random access memory (PoRAM) device, a magnetic random access memory (MRAM) device, a ferroelectric random access memory (FRAM) device, etc., and/or at least one volatile memory device such as a dynamic random access memory (DRAM) device, a static random access memory (SRAM) device, a mobile DRAM device, etc. The storage device 230 may be a solid stage drive (SSD) device, a hard disk drive (HDD) device, a Compact Disc Read-Only Memory (CD-ROM) device, etc.

The I/O device 240 may be an input device such as a keyboard, a keypad, a touchpad, a touch-screen, a mouse, etc., and an output device such as a printer, a speaker, etc. In some example embodiments, the display device 260 may be included in the I/O device 240. The power supply 250 may provide a power for operations of the electronic device 200. The display device 260 may communicate with other components via the buses or other communication links.

As described above, the display device 260 may include a display panel, a data driver, a scan driver, a power controller, and a timing controller. The display panel may include a plurality of pixels. A plurality of data lines and a plurality of scan lines may be formed on the display panel. The data driver may provide data signals to the pixels through the data line. The scan driver may generate scan signals based on a scan control signal and a scan voltage, and provide the scan signals to the pixels through the scan lines. The timing controller may generate a data control signal that controls the data driver, a scan control signal that controls the scan driver, and a power control signal that controls the power controller based on a first image data and a control signal. The timing controller may generate the power control signal based on the first image data and the control signal from an external device. The timing controller may output the power control signal that selects one of a first driving mode that fix a transient time of a driving voltage or a second driving mode that change the transient time of the driving voltage. Further, the timing controller may output the power control signal that drives the power controller in the second driving mode and selects one of the transient times stored in the power controller. The power controller may select the first driving mode of the second driving mode based on the power control signal. Further, the power controller may store a plurality of transient speeds that represents a speed at which a voltage level of the driving voltage corresponding to 1 bit is changed and select one of the transient speeds. In some example embodiments, the power controller may be driven in the second driving mode, select a second transient speed (e.g., 1 LSB/5 us) faster than a first transient speed (e.g., 1 LSB/40 us), and change the driving voltage from the first voltage level to the second voltage level based on the power control signal from the timing controller when a driving frequency of the display device 260 is changed. In other example embodiments, the power controller may be driven in the second driving mode, select a third transient speed (e.g., 1 LSB/100 us) slower than the first transient speed (e.g., 1 LSB/40 us), and change the driving voltage from the first voltage level to the second voltage level based on the power control signal from the timing controller when the display device 260 turns on. In other example embodiments, the power controller may be driven in the second driving mode, select the third transient speed (e.g., 1 LSB/100 us) slower than the first transient speed (e.g., 1 LSB/40 us), and change the driving voltage from the first voltage level to the second voltage level based on the power control signal from the timing controller when the gamma voltages of the display device 260 are changed. In other example embodiments, the power controller may be driven in the second driving mode, select the third transient speed (e.g., 1 LSB/100 us) slower than the first transient speed (e.g., 1 LSB/40 us), and change the driving voltage from the first voltage level to the second voltage level based on the power control signal from the timing controller when an image data having a set or predetermined pattern is provided to the display device 260. In other example embodiments, the timing controller may provide the power control signal to the power controller based on a peripheral temperature of the display device 260. The power controller may be driven in the second driving mode, select the third transient speed (e.g., 1 LSB/100 us) slower than the first transient speed (e.g., 1 LSB/40 us), and change the driving voltage from the first voltage level to the second voltage level based on the power control signal from the timing controller.

As described above, the electronic device 200 according to example embodiments may prevent or reduce defect such as a luminance difference and a flicker when the driving voltage is changed by including the display device 260 that determines the transient time of the driving voltage to the data driver based on the power control signal.

The present inventive concept may be applied to a display device and an electronic device having the display device. For example, the present inventive concept may be applied to a computer monitor, a laptop, a digital camera, a cellular phone, a smart phone, a smart pad, a television, a personal digital assistant (PDA), a portable multimedia player (PMP), a MP3 player, a navigation system, a game console, a video phone, etc.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present invention". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

The electronic or electric devices and/or any other relevant devices or components according to embodiments of the present invention described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present invention.

Although exemplary embodiments of a display device and an electronic device having the same have been specifically described and illustrated herein, many modifications and variations will be apparent to those skilled in the art. Accordingly, it is to be understood that a display device and an electronic device having the same constructed according to principles of this invention may be embodied other than as specifically described herein. The invention is also defined in the following claims, and equivalents thereof.

What is claimed is:

1. A display device comprising:

a display panel comprising a plurality of pixels;

a data driver configured to provide a data signal to the plurality of pixels;

a scan driver configured to provide a scan signal to the plurality of pixels;

a power controller configured to provide a driving voltage to the data driver and the scan driver, the driving voltage comprising: an analog driving voltage, and at least one of a gamma voltage or a common voltage; and a timing controller configured to generate a data control signal to control the data driver, a scan control signal to control the scan driver, and a power control signal to control the power controller based on an image data and a control signal, wherein the power controller is configured to determine a transient time of the gamma voltage and the common voltage based on a peripheral temperature of the display device, a transient time of the analog driving voltage being determined considering an inrush current of the display device, wherein the transient time of the analog driving voltage starts when a driving frequency of the display device changes from a first frequency to a second frequency and during which the driving voltage is changed from a first voltage level to a second voltage level based on the power control signal, wherein an image with luminance is to be displayed during an entire duration of the transient time of the analog driving voltage, and wherein the driving voltage remains at the first voltage level prior to a starting point of the transient time of the analog driving voltage and remains at the second voltage level from an end point of the transient time of the analog driving voltage until a starting point of a next transient time of the analog driving voltage, and wherein the power controller is further configured to determine a transient speed of the analog driving voltage and a transient speed of the common voltage when the image data comprises a set pattern, wherein the set pattern is to consume more power than a set power consumption of the display device, wherein the transient speed of the analog driving voltage and the transient speed of the common voltage are equal.

2. The display device of claim 1, wherein the power controller is configured to store a plurality of transient speeds of the driving voltage corresponding to a bit and selects one of the plurality of transient speeds based on the power control signal.

3. The display device of claim 2, wherein the power controller is configured to change the driving voltage from the first voltage level to the second voltage level at a selected transient speed.

4. The display device of claim 1, wherein the power controller is driven in a first driving mode during which the transient time of the analog driving voltage is uniformly maintained or a second driving mode during which the transient time of the analog driving voltage is changed based on the power control signal.

5. The display device of claim 4, wherein the power controller is driven in the first driving mode based on the power control signal from the timing controller, and wherein the power controller is configured to change a voltage level of the driving voltage at a first transient speed in the first driving mode.

6. The display device of claim 5, wherein the power controller is driven in the second driving mode based on the power control signal from the timing controller when the driving frequency of the display device is changed, and wherein the power controller is configured to change the voltage level of the driving voltage from the first voltage level to the second voltage level at a second transient speed faster than the first transient speed in the second driving mode.

7. The display device of claim 5, wherein the power controller is driven in the second driving mode based on the power control signal from the timing controller when the display device turns on, and wherein the power controller is configured to change the voltage level of the driving voltage from the first voltage level to the second voltage level at a third transient speed slower than the first transient speed in the second driving mode.

8. The display device of claim 5, wherein the power controller is driven in the second driving mode based on the power control signal from the timing controller when gamma voltages of the display device are changed, and wherein the power controller is configured to change the voltage level of the driving voltage from the first voltage level to the second voltage level at a third transient speed slower than the first transient speed in the second driving mode.

9. The display device of claim 5, wherein the power controller is driven in the second driving mode based on the power control signal from the timing controller when the image data having a set or predetermined pattern is provided, and wherein the power controller is configured to change the voltage level of the driving voltage from the first voltage level to the second voltage level at a third transient speed slower than the first transient speed in the second driving mode.

10. The display device of claim 9, wherein the timing controller is configured to provide the power control signal to the power controller based on the peripheral temperature of the display device, wherein the power controller is driven in the second driving mode based on the power control signal from the timing controller, and wherein the power controller is configured to change the voltage level of the driving voltage from the first voltage level to the second voltage level at the third transient speed slower than the first transient speed in the second driving mode.

11. The display device of claim 1, wherein the driving voltage comprises the common voltage to the data driver.

12. An electronic device comprising a display device and a processor to control the display device, the display device comprising:

a display panel including a plurality of pixels;

a data driver configured to provide a data signal to the pixels;

a scan driver configured to provide a scan signal to the pixels;

a power controller configured to provide a driving voltage to the data driver and the scan driver, the driving voltage comprising: an analog driving voltage, and at least one of a gamma voltage or a common voltage; and a timing controller configured to generate a data control signal to control the data driver, a scan control signal to control the scan driver, and a power control signal to control the power controller based on an image data and a control signal, and wherein the power controller is configured to determine a transient time of the gamma voltage and the common voltage based on a peripheral temperature of the display device, a transient time of the analog driving voltage being determined considering an inrush current of the display device, wherein the transient time of the analog driving voltage starts when a driving frequency of the display device changes from a first frequency to a second frequency and during which the driving voltage is changed from a first voltage level to a second voltage level based on the power control signal, wherein an image with luminance is to be displayed during an entire duration of the transient time of the analog driving voltage, and wherein the driving voltage remains at the first voltage level prior to a starting point of the transient time of the analog driving voltage and remains at the second voltage level from an end point of the transient time of the analog driving voltage until a starting point of a next transient time of the analog driving voltage, and wherein the power controller is further configured to determine a transient speed of the analog driving voltage and a transient speed of the common voltage when the image data comprises a set pattern, wherein the transient speed of the analog driving voltage and the transient speed of the common voltage are equal, and wherein the set pattern is to consume more power than a set power consumption of the display device.

13. The electronic device of claim 12, wherein the power controller is configured to store a plurality of transient speeds of the driving voltage corresponding to a bit and selects one of the plurality of transient speeds based on the power control signal.

14. The electronic device of claim 13, wherein the power controller is configured to change the driving voltage from the first voltage level to the second voltage level at a selected transient speed.

15. The electronic device of claim 12, wherein the power controller is configured to store a first transient speed of the driving voltage corresponding to a bit, a second transient speed faster than the first transient speed, and a third transient speed slower than the first transient speed, and wherein the power controller is configured to select one of the first transient speed, the second transient speed, and the third transient speed based on the power control signal.

16. The electronic device of claim 15, wherein the power controller is configured to change a voltage level of the driving voltage at the first transient speed in a first driving mode during which a transient speed of a driving speed is uniformly maintained.

17. The electronic device of claim 15, wherein the power controller is driven in a second driving mode during which the transient time of the analog driving voltage is changed based on the power control signal from the timing controller when the driving frequency of the display device is changed, and wherein the power controller is configured to change a voltage level of the driving voltage from the first voltage level and the second voltage level at the second transient speed in the second driving mode.

18. The electronic device of claim 15, wherein the power controller is driven in a second driving mode during which the transient time of the analog driving voltage is changed based on the power control signal from the timing controller when the display device turns on, and wherein the power controller is configured to change a voltage level of the driving voltage from the first voltage level to the second voltage level at the third transient speed in the second driving mode.

19. The electronic device of claim 15, wherein the power controller is driven in a second driving mode during which the transient time of the analog driving voltage is changed based on the power control signal from the timing controller when gamma voltages of the display device are changed, and wherein the power controller is configured to change a voltage level of the driving voltage from the first voltage level to the second voltage level at the third transient speed in the second driving mode.

* * * * *